(12) United States Patent
Guest

(10) Patent No.: US 7,686,349 B2
(45) Date of Patent: Mar. 30, 2010

(54) TUBE COUPLINGS

(75) Inventor: Timothy Stephen Guest, Bray (GB)

(73) Assignee: John Guest International Limited, Middlesex (GB)

( * ) Notice: Subject to any disclaimer, the term of this patent is extended or adjusted under 35 U.S.C. 154(b) by 141 days.

(21) Appl. No.: 11/708,410

(22) Filed: Feb. 20, 2007

(65) Prior Publication Data

US 2007/0194568 A1    Aug. 23, 2007

(30) Foreign Application Priority Data

Feb. 21, 2006    (GB) ................................ 0603429.2

(51) Int. Cl.
*F16L 39/00*    (2006.01)

(52) U.S. Cl. ...................... 285/321; 285/307; 285/319; 285/921

(58) Field of Classification Search ................ 285/305, 285/307, 319, 321, 340, 921
See application file for complete search history.

(56) References Cited

U.S. PATENT DOCUMENTS

| | | | | |
|---|---|---|---|---|
| 2,253,018 A | * | 8/1941 | Cowles | 285/276 |
| 3,262,721 A | * | 7/1966 | Knight | 285/148.14 |
| 3,933,378 A | | 1/1976 | Sandford et al. | |
| 4,733,890 A | * | 3/1988 | Vyse | 285/148.14 |
| 4,946,200 A | * | 8/1990 | Blenkush et al. | 285/38 |
| 5,102,170 A | | 4/1992 | Inoue | 285/23 |
| 5,374,084 A | * | 12/1994 | Potokar | 285/27 |
| 5,540,463 A | * | 7/1996 | Potokar | 285/319 |
| 6,199,919 B1 | | 3/2001 | Kawasaki et al. | |
| 2004/0140376 A1 | * | 7/2004 | Alexander et al. | 239/588 |
| 2005/0167980 A1 | * | 8/2005 | Bauer et al. | 285/308 |

FOREIGN PATENT DOCUMENTS

| | | |
|---|---|---|
| DE | 101 14 326 A1 | 10/2002 |
| EP | 0 751 329 A1 | 1/1997 |
| GB | 1 520 742 | 8/1978 |
| GB | 1 573 757 | 8/1980 |
| GB | 2 131 903 A | 6/1984 |
| GB | 2 167 147 A | 5/1986 |
| GB | 2 172 948 A | 10/1986 |

\* cited by examiner

*Primary Examiner*—Aaron M Dunwoody
*Assistant Examiner*—Fannie Kee
(74) *Attorney, Agent, or Firm*—Workman Nydegger

(57) ABSTRACT

A tube coupling includes a body having a cylindrical projection to engage in a tube to be secured to the body. A grab ring is mounted by arms having openings to snap onto abutments on the coupling body. The grab ring encircles with a clearance the projection and engages an outer surface of a tube pushed onto the projection to grip and resist withdrawal of the tube from the projection.

15 Claims, 3 Drawing Sheets

TUBE COUPLINGS

CROSS-REFERENCE TO RELATED APPLICATIONS

This application claims the priority of United Kingdom Application Serial No. 0603429.2, filed Feb. 21, 2006, which is incorporated herein by specific reference.

BACKGROUND OF THE INVENTION

1. The Field of the Invention

This invention relates to tube couplings and in particular to tube couplings comprising coupling bodies to which a tube is connected.

2. The Relevant Technology

A number of arrangements are known for securing tubes to tube coupling bodies. For example our UK Patent Specification No. 1520742 discloses a coupling body having a throughway open at one end to receive a tube with a collet having resilient fingers located in the open end of the coupling body and cooperating with an internal cam surface in the coupling body to cause, with movement of the collet outwardly of the coupling body, the collet arms to be forced inwardly into gripping engagement with the tube to lock the tube in the coupling body. We have a number of subsequent patent specifications disclosing further development of this arrangement including UK patent specification no. 1573757, UK patent specification no. 2131903, UK patent specification no. 2167147 and UK patent specification no. 2172948. These arrangements all deploy a collet of one form or another to lock the tube in the coupling body. Arrangements have also been devised in which the tube is locked in the coupling body by a grab ring such as the arrangement shown in our European patent publication no. 0751329. In this arrangement a grab ring is mounted internally in a coupling body to engage the outer surface of a tube in the coupling body to resist withdrawal of the tube.

The object of the present invention is to provide a simple arrangement for securing a tube to a coupling body which can easily be disconnected and reassembled when required and also allows the user to see the tube has been correctly secured to the coupling body.

SUMMARY OF THE INVENTION

This invention provides a tube coupling comprising a coupling body having a cylindrical projection to engage in a tube to be secured to the body, and a grab ring mounted externally of the coupling body and encircling with a clearance the projection to encircle and engage an outer surface of the tube located on the projection to grip and resist withdrawal of the tube from the projection.

In a preferred form of the invention the coupling body may have a throughway extending through the projection for flow of a gas or liquid between the tube and coupling body.

It is further preferred that the projection has an encircling seal to seal with the internal surface of a tube located on the projection.

In the latter case the projection may have an encircling groove and an O-ring seal is located in the groove to engage and seal with the internal surface of a tube located on the projection.

In any of the above arrangements the coupling body may have a main portion from which the cylindrical projection extends and an axially facing shoulder encircling the projection to receive an end of a tube located on the projection and the grab ring is mounted on the main portion of the coupling body with the ring spaced from the shoulder to engage and lock with the outer surface of a tube located on the projection at a location spaced from the end of the tube.

Also in any of the above arrangements wherein the grab ring may have means to mount the ring on the main portion of the coupling body with the ring spaced along the projection from the main portion.

In the latter case the means to mount the grab ring on the main portion of the coupling body may comprise one or more legs extending axially from the grab ring to the main portion of the coupling body.

More specifically the grab ring has at least two legs projecting from the ring at spaced locations to the main portion of a coupling body.

Furthermore, detent means may be provided between the legs and main portion of the coupling body to retain the grab ring in position around the projection of the coupling body.

For example the main portion of the coupling body may have radially projecting lugs spaced around the coupling body and the grab ring has apertures which snap around the lugs to retain the legs and thereby the grab ring in position on the coupling body.

In a further arrangement the legs of the grab ring may be integrally molded into the main portion of the coupling body to locate the grab ring around the projection.

In any of the above arrangements the grab ring may comprise a cylindrical element having an inturned flange at one end formed with internal teeth to grip and engage a tube inserted through the grab ring on the projection.

Also in any of the above arrangements the legs of the grab ring may be molded into the main portion of the coupling body to support the grab ring spaced along the projection from the main portion.

According to a further feature of the invention a cap to fit the coupling body and enclosed the projection is provided with an aperture in the top of the cap through which a tube is inserted onto the projection of the coupling body.

The arrangement may further include a device to slide along a tube located on the cylindrical projection to release the grab ring from the tube and allow the tube to be withdrawn from the grab ring/projection.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION OF THE PREFERRED EMBODIMENTS

Figure 1:
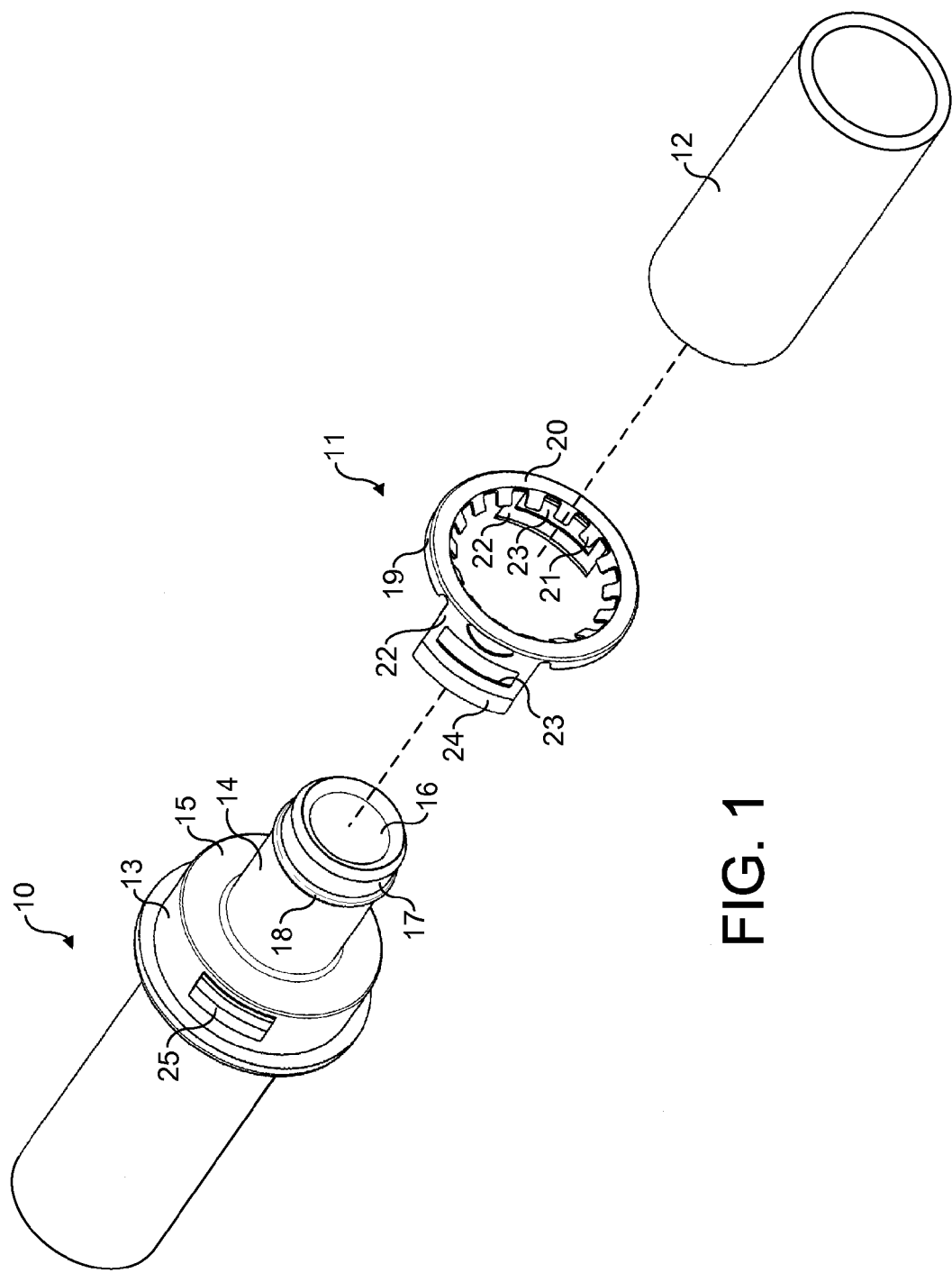
FIG. 1 is an exploded perspective view of a tube coupling comprising a coupling body, a grab ring for securing a tube to the coupling body, and a tube.

Referring firstly to FIG. 1 of the drawings, there is shown a tube coupling body formed as a plastics molding as indicated generally at 10, a metal grab ring indicated generally at 11 for securing a tube to the coupling body and a portion of a plastics or metal tube 12 for connection to the coupling body.

The coupling body has a main body portion 13 of generally cylindrical form having a coaxial cylindrical projection 14 extending from one end of the cylinder with a step 15 between the outer diameter of the cylinder and the outer diameter of the projection. The coupling body has a throughway 16 extending through the body including the projection 14.

The cylindrical projection 14 is intended to receive an end portion of a tube and adjacent the end of the projection there is an annular groove 17 in which an O-ring seal 18 is located to seal with the internal surface of the tube. The dimensions of the internal surface of the tube are such that the tube is a close or interference fit with the outer surface of the projection. Alternatively or in addition, the projection 14 is formed with an annular integral bumper, rib or barbs or is formed as a "fir-tree" to grip inside the tube.

The tube 12 is secured in place on the projection 14 by means of the grab ring 11 which is formed in a hard spring metal and comprising a short annular sleeve portion 19 having an in turned flange 20 formed with angled teeth 21 around its inner periphery to receive and grip the tube 12. The grab ring has axially projecting lugs 22 spaced around the grab ring at diametrically opposite locations formed with elongate rectangular slots 23. The ends of the lugs have out turned edge portions 24 for a user to lever the lugs outwardly as described later.

The main body portion 13 of the coupling body has integral radially outwardly extending abutments 25 which the lugs 22 snap over when the grab ring is located on the main portion of the coupling body with the abutments engaging in the slots in the lugs to hold the grab ring in place on the coupling body around the projection 14 and spaced from the end wall 15.

Figure 2:
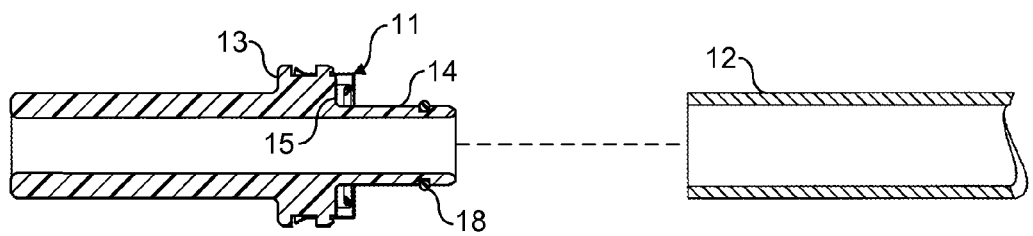
FIG. 2 is a section view through a tube coupling body with grab ring in situ to receive a tube.
Figure 3:
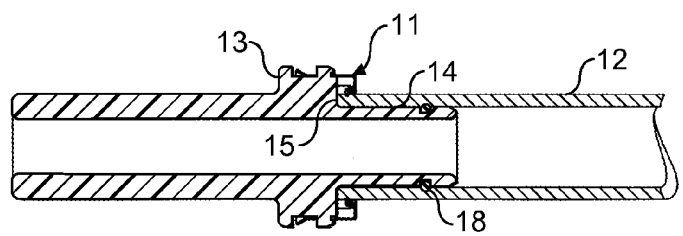
FIG. 3 is a similar view to FIG. 1 showing the tube secured to the coupling body by the grab ring.

With the grab ring 11 assembled on the coupling body as shown in FIG. 2, a tube 12 is pushed over the projection 14 past the O-ring seal 18 into the grab ring until the end of the tube abuts the end face 15. The angled teeth 21 of the grab ring engage the outer surface of the tube to lock the tube in place on the projection and the O-ring seal 18 provides a seal against lost fluid or gas from between the tube and projection. The fully assembled position is shown in FIG. 3.

Figure 4:
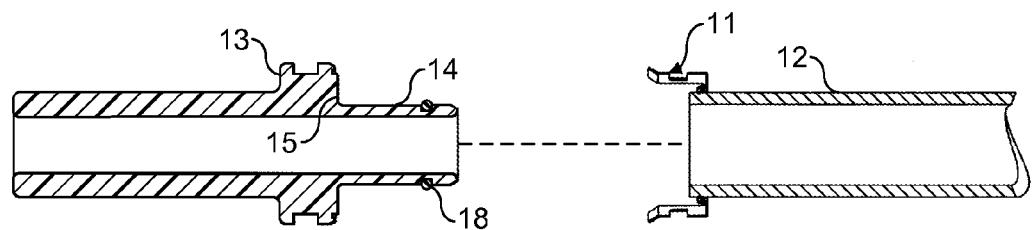
FIG. 4 is a further view with the tube detached from the coupling body with the grab ring.

To release the tube from the coupling body, the lugs 22 are lifted radially outwardly by levering under the out turned ends 24 to disengage from the abutment 25. The tube can then be drawn off the projection 14 as illustrated in FIG. 4 of the drawings.

Thus the arrangement provides a simple and easily operated arrangement for locating a tube on a tube coupling body which can easily be visually checked to ensure that the tube is correctly positioned on the body and gripped by the grab ring which is on the outside of the fitting body.

It will be appreciated that the grab ring can be designed and located on the body in a multitude of ways. In its simplest form, the grab ring could be made tubular and simply cold formed onto the coupling body or could be molded into the coupling body.

The grab ring can have more than two legs or clips to locate it on the coupling body and the clips can be designed so that they can easily be released by hand or by a special tool or can be arranged so that they cannot be released to provide a permanent connection of a tube to the coupling body.

The grab ring can be specifically designed to allow release of the tube with the use of a tool or "collet cover" which when slid axially towards the connector can engage with and then expand the teeth off the tube allowing removal of the tube but keeping the grab ring mounted on the body. A cap can be provided to fit over the coupling body to conceal the connection of the tube to the coupling body once the correct engagement of the tube with the coupling body has been made. The fitting can be supplied in its component part with or without the cover the latter making it more aesthetically attractive and robust to the environment where necessary.

Figure 6:
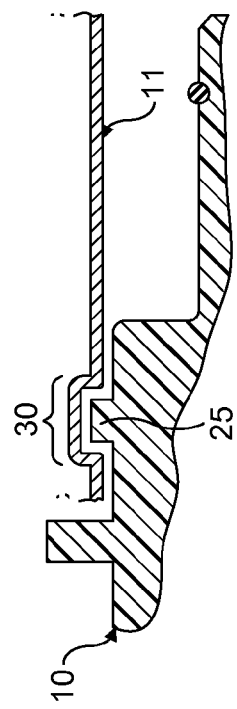
FIG. 6 is a cross-section view through the arrangement of FIG. 5.
Figure 6:
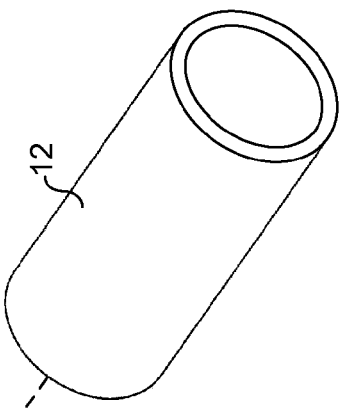
Figure 5:
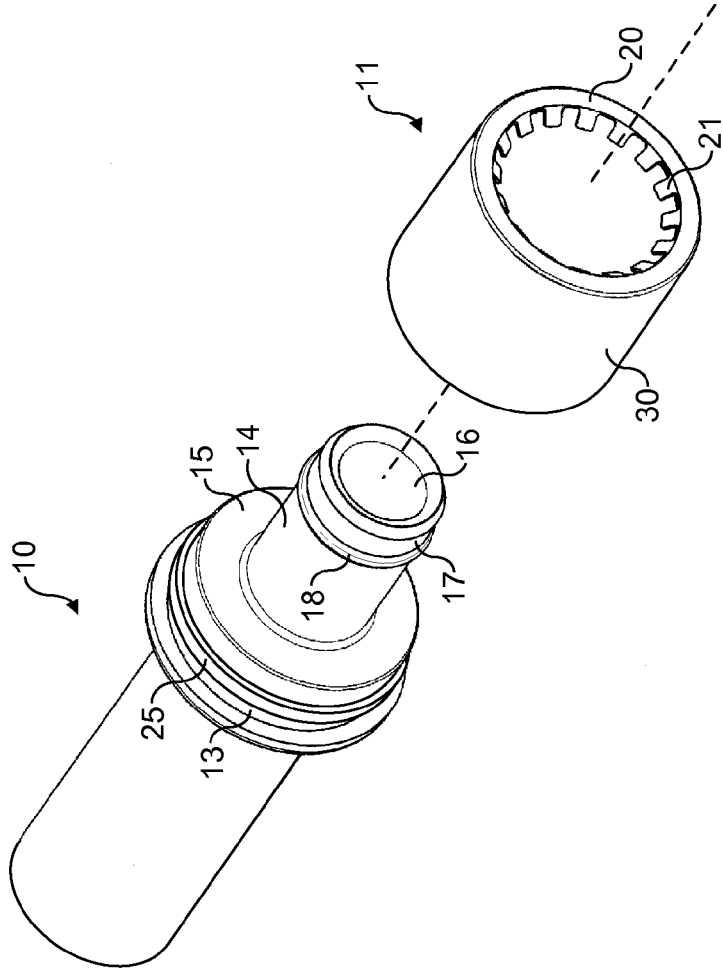
FIG. 5 is a similar view to FIG. 1 showing a modified arrangement.

The legs of the grab ring could be molded onto the coupling or the grab ring itself could be molded into the coupling. FIGS. 5 and 6 show a further arrangement in which the grab ring is formed in a sleeve 30 which is either molded into or crimped onto the coupling. To that end the abutment 25 would be formed as a continuous annular molding for the end of the sleeve to be crimped over.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A tube coupling comprising:
   a coupling body having a main portion;
   a cylindrical projection rigidly fixed to the main portion of the coupling body, the cylindrical projection being configured to engage an inner surface of a tube to be secured to the coupling body; and
   a grab ring mounted on the coupling body, at least a portion of the grab ring encircling the cylindrical projection with a clearance gap being formed between the grab ring and the cylindrical projection, the grab ring comprising a circular sleeve coupled to the coupling body and extending axially from the coupling body, one or more legs extending axially from the sleeve of the grab ring to the main portion of the coupling body, and a plurality of grab elements that project radially inwardly from the circular sleeve toward the cylindrical projection to engage an outer surface of the tube when the tube is located on the cylindrical projection to grip and resist withdrawal of the tube from the cylindrical projection.

2. A tube coupling as claimed in claim 1, further comprising a throughway extending through the cylindrical projection for flow of a gas or liquid between the tube and the coupling body.

3. A tube coupling as claimed in claim 1, wherein the cylindrical projection has an encircling seal to seal with the inner surface of the tube when the tube is located on the cylindrical projection.

4. A tube coupling as claimed in claim 3, wherein the encircling seal on the cylindrical projection is an O-ring seal located in a groove formed in the cylindrical projection.

5. A tube coupling as claimed in claim 1, wherein the main portion of the coupling body has a cylindrical configuration from which the cylindrical projection extends and an axially facing step on the main portion encircling the cylindrical projection to receive an end of the tube.

6. A tube coupling as claimed in claim 1, wherein the grab ring has at least two legs projecting from the sleeve at spaced locations around the sleeve to the main portion of the coupling body.

7. A tube coupling as claimed in claim 6, wherein detent means are provided between the legs and the coupling body to retain the grab ring in position around the cylindrical projection.

8. A tube coupling as claimed in claim 7, wherein the coupling body has radially projecting lugs and the legs of the grab ring have apertures which snap over the lugs to retain the legs and thereby the grab ring in position on the coupling body.

9. A tube coupling as claimed in claim 1, wherein the legs of the grab ring are integrally molded into the coupling body to locate the grab ring around the cylindrical projection.

10. A tube coupling as claimed in claim 1, wherein the sleeve of the grab ring has an inturned flange at one end and wherein the grab elements include internal teeth formed on the inturned flange, the internal teeth being configured to grip and engage the outer surface of the tube when the tube is inserted through the grab ring on the cylindrical projection.

11. A tube coupling as claimed in claim 1, wherein the sleeve extends over a portion of the coupling body adjacent the cylindrical projection and is molded or crimped to the coupling body.

12. A tube coupling as claimed in claim 1, wherein the cylindrical projection is integrally formed as a single unitary member with the coupling body.

13. A tube coupling comprising:
a tubular coupling body having a main portion;
a tubular cylindrical projection rigidly fixed to the main portion of the coupling body;
a grab ring mounted on the coupling body so that at least a portion of the grab ring at least partially encircles the cylindrical projection, the grab ring comprising a sleeve, at least two spaced apart legs projecting from the sleeve of the grab ring and engaging the main portion of the coupling body, and a plurality of grab elements that project radially inwardly from the sleeve toward the cylindrical projection; and
a tube having a first end with an outer surface, the outer surface at the first end of the tube having a cylindrical configuration with no projections outwardly extending therefrom, the first end of the tube being received over the cylindrical projection and advanced between the cylindrical projection and the plurality of grab elements, the plurality of grab elements engaging the outer surface of the tube to grip the tube and resist withdrawal of the tube from the cylindrical projection.

14. A tube coupling as claimed in claim 13, wherein the grab ring is removably mounted to the coupling body.

15. A tube coupling as claimed in claim 13, wherein the sleeve of the grab ring completely encircles the coupling body or the cylindrical projection.

* * * * *